United States Patent [19]

Hewel et al.

[11] Patent Number: 5,700,900
[45] Date of Patent: Dec. 23, 1997

[54] COPOLYAMIDES WITH LONG-CHAIN POLYAMIDE UNITS

[75] Inventors: Manfred Hewel, Rodels; Hans Dalla Torre, Domat/Ems, both of Switzerland

[73] Assignee: EMS-Inventa AG, Zürich, Switzerland

[21] Appl. No.: 528,860

[22] Filed: Sep. 15, 1995

Related U.S. Application Data

[63] Continuation of Ser. No. 172,150, Dec. 23, 1993, abandoned.

[30] Foreign Application Priority Data

Dec. 24, 1992 [CH] Switzerland ............... 03956/92

[51] Int. Cl.[6] .................................. C08G 69/26
[52] U.S. Cl. ............... 528/335; 528/310; 528/332; 525/420; 525/419; 525/418; 525/432; 264/501
[58] Field of Search .................. 528/335, 310, 528/332; 525/420, 419, 418, 432; 264/501

[56] References Cited

U.S. PATENT DOCUMENTS

| | | |
|---|---|---|
| 4,232,145 | 11/1980 | Schmid et al. . |
| 4,268,661 | 5/1981 | Schmid et al. . |
| 4,731,421 | 3/1988 | Hoppe et al. . |
| 4,937,322 | 6/1990 | Barthelemy ............... 528/349 |
| 5,266,655 | 11/1993 | Prevost et al. ............ 525/432 |

FOREIGN PATENT DOCUMENTS

| | | |
|---|---|---|
| 0070001 | 1/1983 | European Pat. Off. . |
| 0313436 | 4/1989 | European Pat. Off. . |
| 0423472 | 4/1991 | European Pat. Off. . |
| 2 575 756 | 7/1986 | France . |
| 1745466A | 1/1972 | Germany . |
| 62-143969 | 6/1987 | Japan . |
| 62-290725 | 12/1987 | Japan . |
| 63-120645 | 5/1988 | Japan . |
| 2006797B | 5/1979 | United Kingdom . |
| 2129370 | 5/1984 | United Kingdom . |
| 2170209 | 7/1986 | United Kingdom . |

*Primary Examiner*—Samuel A. Acquah
*Assistant Examiner*—Dvc Troung
*Attorney, Agent, or Firm*—Spencer & Frank

[57] ABSTRACT

A copolyamide composition and article molded therefrom, the molded article being transparent, being especially rigid, tough and cold impact resistant, having good resistance to solvents, and exhibiting negligible changes in mechanical properties in the conditioned state due to very low water absorption. The copolyamide composition including long-chain monomer building blocks and being comprised of from about 30 to about 96 parts by weight of at least one long-chain monomer which is suitable as a long-chain building block for a polyamide and which has from 9 to 12 carbon atoms; and from about 4 to about 70 parts by weight of precursor monomers for semiaromatic polyamides, which precursor monomers comprise at least one diamine, $H_2N-R-NH_2$, and at least one aromatic dicarboxylic acid in an approximately equimolar ratio with one another, wherein R is a radical selected from the group consisting of a straight-chain radical having 2 to 12 carbon atoms, an aliphatic radical having 2 to 12 carbon atoms, an araliphatic radical having 7 to 12 carbon atoms, and a cycloaliphatic radical having 6 to 42 carbon atoms. Advantageously, up to about 15 mole percent of the at least one aromatic dicarboxylic acid can be replaced by a long-chain aliphatic dicarboxylic acid having 9 to 36 carbon atoms.

13 Claims, No Drawings

COPOLYAMIDES WITH LONG-CHAIN POLYAMIDE UNITS

CROSS-REFERENCE TO RELATED APPLICATION

This application is a continuation of application Ser. No. 08/172,150 filed Dec. 23, 1993, now abandoned.

The present disclosure relates to the subject matter disclosed in Swiss Application No. 03 956/92-0 of Dec. 24th, 1992, the entire specification of which is incorporated herein by reference.

BACKGROUND OF THE INVENTION

1. Field of the Invention

The invention relates to thermoplastic molded articles comprising transparent copolyamides with long-chain monomer building blocks and, in particular, to copolyamide compositions and articles molded therefrom which, apart from their excellent transparency, have a particularly high degree of toughness, an outstanding resistance to solvents, and are characterized by very low water absorption.

The thermoplastic copolyamides according to the invention are moldable into a wide variety of hollow or solid articles having regular or irregular shapes including, but not limited to, hollow articles, such as containers and tubes, and solid articles, such as bars, plates, films, coatings, and fibers. These articles are useful, for example, as protective or covering parts or tubing in apparatus and instruments, in devices and piping systems, as pressure containers for liquids and gases, as mechanically strong parts for medical and fashion articles, as parts for use with food items, as abrasion and impact resistance coatings and sheathings for utility and sports equipment, as well as for films and fibers.

2. Background of the Related Art

EP 0 313 436 relates to copolyamides which are transparent and thermoplastic, and which are produced most frequently from a long-chain lactam, a terephthalic acid and/or isophthalic acid, and a cycloaliphatic diamine which most often is substituted. These copolyamides are relatively rigid and have a high dimensional stability when exposed to heat, but do not have a high degree of toughness and resistance to solvents. They have, moreover, a high fusion viscosity which makes it difficult to process them.

A transparent copolyamide is also know from EP 0 423 472. This copolyamide has good resistance to alcohols and boiling water, and is polycondensed from decamethylene diamine, trimethylhexamethylene diamine, dicycan, and terephthalic acid and/or isophthalic acid. This copolyamide has limited application, however, because of an insufficient impact resistance, especially at low temperatures, and because of the expensive raw materials used.

In British Patent Application No. 2,129,370 A, a multilayered film for packaging food items is described having one layer comprised of vinyl alcohol copolymers and another layer, employed as a cover layer, comprised of multi-unit, i.e., multi-monomeric, aliphatic polyamides which are produced from different monomers, such as lactams, long-chain aliphatic dicarboxylic acids and/or terephathalic acid or isophthalic acid and aliphatic diamines or xylylene diamine. These polyamides are indeed flexible, but are semicrystalline and thus not transparent, and are specifically suitable for packaging food items because they provide a good oxygen barrier in contrast to products based on PA 12 (polyamide 12).

JP 63/120,645A teaches a three-layer laminate in which one layer is comprised of a polycarbonate and another is comprised of a semicrystalline polyamide. From 60 to 100% of the semicrystalline polyamide is comprised of aliphatic diamines and terephthalic acid or isophthalic acid, and up to 40% of lactams or aliphatic diamines and aliphatic dicarboxylic acids which, due to providing a good barrier effect against oxygen and carbon dioxide, can be used for beverage bottles. These products are composed of several constituent units, i.e., monomers, and comprise caprolactam, hexamethylene diamine and terephthalic acid or isophthalic acid, and must have the high melt viscosities of the polycarbonate in order to achieve the required mechanical resistance for beverage bottles. They consequently differ significantly from the transparent copolyamides claimed in the following according to the present invention.

In JP 62/290,725A, protected hollow bodies for packaging are disclosed comprising polyamides which are polycondensed. The monomers hexamethylene diamine, terephthalic acid, isophthalic acid and caprolactam are used and provide good barrier properties to the polyamide. The migration of the monomer from these polyamides interferes, however, and the packaging products show a relatively high moisture absorption.

The same disadvantages apply for JP 62/143,969 A which discloses blow-molded transparent films comprising polyamides. The polyamides include from 10 to 100% of polyamides comprising aliphatic diamines and isophthalic acids or terephthalic acid, and from 0 to 90% of polyamides comprising short-chain lactams or aliphatic diamines or aliphatic dicarboxylic acids.

Important requirements for applications employing amorphous, highly transparent polyamides include a high degree of toughness and a high resistance to stress cracking, particularly upon exposure to aqueous and organic solvents. These properties, in combination with high impact resistance and rigidity, have not been achieved to a satisfactory degree to date.

It is therefor an object of the present invention to produce a copolyamide composition and a transparent molded article molded therefrom which, on the one hand, is especially rigid, tough and cold impact resistant, and, on the other hand, has good resistance to solvents and exhibits negligible changes in mechanical properties in the conditioned state due to very low water absorption.

SUMMARY OF THE INVENTION

This and other objects are accomplished by the present invention which provides a copolyamide composition and an article molded therefrom, wherein the copolyamide composition comprises:

at least one copolyamide which includes long-chain monomer building blocks and which is comprised of:
from about 20 to about 96 parts by weight, in particular from about 30 to about 96 parts weight of at least one long-chain monomer which is suitable as a long-chain building block for a polyamide and which has from 9 to 12 carbon atoms; and
from about 4 to about 80 parts by weight, in particular from about 4 to about 70 parts by weight of precursor monomers for semiaromatic polyamides, which precursor monomers comprise at least one diamine, $H_2N$—R—$NH_2$, and at least one aromatic dicarboxylic acid in an approximately equimolar ratio with one another,
wherein R is a radical selected from the group consisting of a straight-chain radical having 2 to 12 carbon atoms, a branched aliphatic radical having 2 to 12 carbon atoms, an araliphatic radical having 7 to 12 carbon atoms, and a cycloaliphatic radical having 6 to 42 carbon atoms.

Optionally, up to about 15 mole percent of the at least one aromatic dicarboxylic acid may be replaced by a long-chain aliphatic dicarboxylic acid having 9 to 36 carbon atoms. While replacement is optional, when replacement is selected, from about 0.0001 to about 15 mole percent of the at least one aromatic dicarboxylic acid can be replaced.

The objects of the present invention are especially accomplished by providing a molded article comprising a copolyamide which was polycondensed from a selected combination of long-chain and short-chain monomers. The inventive molded articles have, on the one hand, good transparency and, on the other hand, sufficient rigidity, impact resistance and high toughness which change only slightly in the conditioned state, i.e., the state after molding. Molding may be accomplished by any of several known thermoplastic molding methods including, but not limited to, extruding, injecting, blowing, and drawing. Suitable molding parameters including temperature and pressure can be readily determined by the artisan based on the physical and chemical properties of the copolyamide composition.

The at least one long-chain monomer for a polyamide may be selected from the group consisting of a lactam having 9 to 12 carbon atoms, an omega-aminocarboxylic acid having 9 to 12 carbon atoms, and an aliphatic dicarboxylic acid having 9 to 12 atoms, in combination with an aliphatic dicarboxylic acid having 9 to 12 carbon atoms.

Preferred long-chain monomers for the copolyamides used for the molded articles according to the invention include long-chain $C_9$ to $C_{12}$ lactams, such as, for example, lauric lactam or the corresponding omega-aminocarboxylic acids, such as, for example, ω-aminolauric acid or the combination of long-chain diamines with dicarboxylic acids with 9 to 12 carbon atoms, such as, for example, dodecane diamine/dodecane dioic acid or dodecane diamine/sabacinic acid or dodecane diamine/$C_{36}$-dimeric acids.

Preferred precursor monomers for semiaromatic polyamides for the copolyamides used for the molded articles according to the invention include diamines and aromatic dicarboxylic acids as follows.

Preferred diamines include cycloaliphatic diamines having substituents arranged so as to be stereochemically bulky or having additional functional groups, such as 3,3'-dimethyl-4,4'-diaminodicyclohexylmethane or 4,4'-diaminodicyclohexyl-2,2-propane or 4,4'-diaminodicyclohexylmethane or 1,3- and 1,4-bis-aminomethylcyclohexane.

Preferred are such diamines compounds having a formula selected from the group consisting of formula I and formula II, wherein

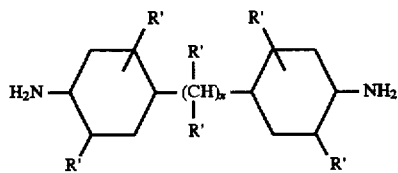

I where x=0 to 6, and R' is a group selected from the group consisting of H—, $CH_3$—, $C_2H_5$—, isopropyl-, and t-butyl-, selected independently of one another; and wherein

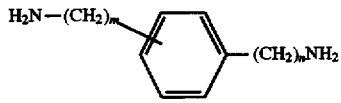

II where m=0 to 6, and n=1 to 6.

Additionally preferred are aliphatic $C_6$–$C_{12}$ diamines with branched or unbranched chains used alone or together with the foregoing from formula I and/or formula II.

These preferred diamines are combined with aromatic dicarboxylic acids, such as isophthalic acid, terephthalic acid, substituted aromatic dicarboxylic acid, for example, 2,6-naphthalene dicarboxylic acid, and 5-t-butylisophthalic acid, in nearly equimolar ratios with one another.

In preferred embodiments, the ratio of the long-chain monomers to the precursor monomers for semiaromatic polyamides is 95 to 40 to 60 to 5, in particular 90 to 45 to 55 to 10. That is, preferably the at least one copolyamide comprises from about 40 to about 95 parts by weight of the at least one long-chain monomer and from about 5 to about 60 parts by weight of the precursor monomers, and, most preferably, the at least one copolyamide comprises from about 45 to about 90 parts by weight of the at least one long-chain monomer and from about 10 to about 55 parts by weight of the precursor monomers.

The copolyamides according to the invention have a statistical distribution of the monomer building blocks. They are distinguished by high transparency although some actually have a melting point. On the other hand, a glass transition temperature, $T_G$, ranges from 30° to 130° C. The copolyamides according to the invention have a very high degree of toughness at room temperature and at low temperatures down to –40° C., and have pronounced good resistance to solvents, such a methanol, isopropanol, acetone, n-hexane, toluene or neutral, as well as acidic and alkaline, aqueous solvents.

The strength and rigidity of the copolyamides according to the invention, moreover, are settable within wide limits. For example, tension modulus of elasticity (DIN 53457) can be varied, for example, between 1000 and 2300N/mm$^2$, and dimensional stability with heat can be varied between 50° and 100° C.

It is understood that the copolyamides of the molded articles according to the invention can be alloyed in a conventional manner with further homopolyamides, preferably with PA 6, PA 11 or PA 12 or with elastomer copolyamides, but also with other commercially available polyamides, preferably to form transparent blends, whereby better mold release and flexibility are achieved. The inventive copolyamides can also comprise, depending on the application, known additives, including but not limited to, stabilizers, reinforcement materials, filler substances and the like.

The molded article according to the invention is preferably an article selected from the group consisting of a hollow body, a plate, a bar, a tube, a film, a protective coating, and a fiber.

DESCRIPTION OF THE PREFERRED EMBODIMENTS

The transparent copolyamides according to the present invention are further described by the following examples:

EXAMPLE 1

In an autoclave having a capacity of 150 l were placed 30.0 kg of lauric lactam, 12.3 kg of 3,3'-dimethyl-4,4'- diaminodicyclohexyl methane, 8.4 kg of terephthalic acid, 0.090 kg of acetic acid, 0.015 kg of phosphorous acid and 5 kg of water via a preheated receiver flooded with nitrogen. The autoclave was heated to from 295° to 305° C. and an expansion to 4 bars took place. Degasification to 0 bars was performed at 270° C. A strand was pulled via a melt pump and a heated aperture nozzle, was guided through a cooling water bath of 2 m length, and was cut by means of a granulation device into uniform granules.

The transparent granules were dried in vacuo at 100° C. for 15 hours and injection molded to for test samples in an injection molding machine of the Arburg type at temperatures around 250° C.

The product had a relative solution viscosity (0.5% in m-cresol) of 1.77 and a melt viscosity at 270° C./122.6N of 1830 Pa·s.

The test of the test samples yielded the following values:

| Impact resistance | 23° C./dry | (DIN 53453): without break |
|---|---|---|
| Notched impact strength | 23° C./dry kJ/m² | (DIN 53453): 12 |
| Notched impact strength | −40° C. dry kJ/m² | (DIN 53453): 5.3 |
| Tensile strength at yield | 23° C./dry N/mm² | (DIN 53455): 42 |
| Elongation at yield | 23° C./dry % | (DIN 53455): 220 |
| Tensile E modulus | 23° C./dry N/mm² | (DIN 53457): 1850 |

EXAMPLE 2

In the same way as in Example 1, into an autoclave were filled 30.5 kg of lauric lactam, 4.6 kg of 3,3'-dimethyl-4,4'-diaminodicyclohexyl methane, 3.1 kg of terephthalic acid, 0.15 kg of acetic acid, 0.025 kg of phosphorous acid and 10 l of water, and were polycondensed at 300° C. After drying, the product was injection molded to form test samples.

The properties were as follows:

| Relative viscosity | (0.5% m-cresol) | | | 1.73 |
|---|---|---|---|---|
| Fusion viscosity | (270°/122.6 N) | | | Pa · s 200 |
| T$_G$ and melting point | | | °C. | 50 and 151 |
| Impact resistance | | (DIN 53453) | | OB |
| Notched impact strength | 23° C./dry | (DIN 53453) | KJ/m² | 17 |
| Tensile strength at yield | 23° C./dry | (DIN 53455) | N/mm² | 48 |
| Elongation at yield | 23° C./dry | (DIN 53455) | % | 310 |
| Tensile E modulus | 23° C./dry | (DIN 53457) | N/mm² | 1550 |

EXAMPLE 3

In a further embodiment, into the same autoclave were placed 17.5 kg of lauric lactam, 5.0 kg of hexamethylene diamine, 7.0 kg of terephthalic acid, 0.130 kg of acetic acid, and 0.10 kg of phosphorous acid and kg of water, and were heated to 295° C. under pressure. After expansion and degasification, the product was drawn off as a rope by means of a spinning pump, was cooled and was granulated.

The transparent test samples produced from dried, transparent granules by means of an injection molding machine had the following properties:

| Relative viscosity | (0.5% m-cresol) | | | 1.57 |
|---|---|---|---|---|
| Fusion viscosity | (270°/122.6 N) | | | Pa · s 450 |
| T$_G$ and melting point | | | °C. | 65 and 223 |
| Impact resistance | | (DIN 53453) | KJ/m² | 60% 24 |
| Notched impact strength | 23° C./dry | (DIN 53453) | KJ/m² | 6.2 |
| Tensile strength at yield | 23° C./dry | (DIN 53455) | N/mm² | 56 |
| Elongation at break | 23° C./dry | (DIN 53455) | % | 75 |
| Tensile E-modulus | 23° C./dry | (DIN 53457) | N/mm² | 1900 |

EXAMPLES 4 TO 6

The Table below shows three polycondensations with different raw material combinations. The solution viscosity and, in conjunction with tension test bars, toughness values were determined.

TABLE I

| Example Nr. | Mole % Lauric lactam | Mole % Diamine | Mole % Dicarboxylic acid | Rel. Visc. 0.5% in m-cresol | Tensile E modulus N/mm² |
|---|---|---|---|---|---|
| 4 | 60% | 20% 3,3'-dimethyl-4,4'-diaminodicyclohexyl-methane | 10% dodecane dioic acid 10% terephthalic acid | 1.68 | 1640 |
| 5 | 60% | 10% 3,3'-di-methyl-4,4'-diaminodicyclohexyl-methane 10% 2-methyl-pentamethylene diamine | 20% terephthalic acid | 1.82 | 1890 |
| 6 | 60% | 20% 3,3'-dimethyl-4,4'-diaminodicyclohexyl-methane | 10% C-36-dimeric acid 10% terephthalic acid | 1.74 | 1780 |

TABLE II

| | Composition of monomers (Mole %) | | | | | | | Melt Visc. Pa·s 270°/ 122. 6 N). |
|---|---|---|---|---|---|---|---|---|
| Example | lauric lactam | hexamethylene diamine (1,4) | 3,3'-dimethyl-4,4'-diamino-dicyclo-hexyl-methane | m-xylylene diamine | terephthalic acid | iso-phthal. acid | Rel. Visc | |
| 7 | 80 | 10 | — | — | 5 | 5 | 1.92 | 360 |
| 8 | 75 | 10 | 2.5 | — | 6.5 | 6.0 | 1.89 | 260 |
| 9 | 50 | 10 | 15 | — | 25 | — | 1.74 | 814 |
| 10 | 50 | 15 | 10 | — | 25 | — | 1.78 | 702 |
| 11 | 50 | — | 25 | — | 25 | — | 1.72 | 1092 |
| 12 | 50 | 10 | — | 15 | 25 | — | 1.83 | 3502 |

TABLE III

Comparison of properties of amorphous copolyamides

| | Grilamid Type TR 55 EMS-Chemie AG | Trogamid Type T Dynamit/Nobel, now Hule AG | Cristamid Type HG 1100 HS 1100 ATO Chem. | PA12 Type L20G EMS-Chemie AG | CoPA 12/6 according to the present invention |
|---|---|---|---|---|---|
| Notched impact strength 23° C./dry (DIN 53453) | 5 kg/m² | 3–4 | 2–3 | 15 | 0.13–10 |
| Notched impact strength –40° C./dry (DIN 53453) | 3 kg/m² | 2–3 | 1.5–2 | 8 | 30–8 |
| Tensile E modulus 23° C./dry (DIN 53455) | 2300 N/mm² | 3200 | 1800 | 1300 | 1000–2300 |
| Elongation at break 23° C./dry (DIN 53455) | 50–150% | 60 | 60–170 | 270 | 200–230 |
| Resistance to stress cracking ing ethanol (100%) and isopropanol (DIN 53449 T₃) | not stable* | not stable* | not stable* | stable** | stable** |

*break after a few seconds
**no break after more than 60 seconds

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A copolyamide composition which is transparent, comprising:

at least one copolyamide which includes long-chain monomer building blocks and which is comprised of:

from about 20 to about 96 parts by weight of at least one long-chain monomer (A) which is suitable as a long-chain building block for a polyamide and which includes a lactam having 12 carbon atoms; and from about 4 to about 80 parts by weight of precursor monomers for semiaromatic polyamides, which precursor monomers comprise at least one diamine (B) and at least two aromatic dicarboxylic acids (C) in which the at least one diamine (B) and the at least two aromatic dicarboxylic acids are in about an equimolar ratio with one another, wherein the at least two aromatic dicarboxylic acids (C) of the precursor monomers for semiaromatic polyamides are selected from the group consisting of isophthalic acid, terephthalic acid, and naphthalene dicarboxylic acid, and wherein the at least one diamine (B) of the precursor monomers for semiaromatic polyamides is selected from the group consisting of hexamethylene diamine, 3,3'-dimethyl-4,4'-diamine-dicyclohexylmethane, 4,4'-diamino-dicyclohexyl-2,2-propane, and m-xylene diamine, and wherein the copolyamide composition has a glass transition temperature ranging from 30° to 130° C. and a tension modulus of elasticity ranging from 1000 to 2300N/mm$^2$.

2. The copolyamide composition according to claim 1, wherein up to about 15 mole percent of the at least two aromatic dicarboxylic acids are replaced by a long-chain aliphatic dicarboxylic acid having 9 to 36 carbon atoms.

3. The copolyamide composition according to claim 1, wherein the at least one copolyamide comprises from about 40 to about 95 parts by weight of the at least one long-chain monomer and from about 5 to about 60 parts by weight of the precursor monomers.

4. The copolyamide composition according to claim 1, wherein the at least one copolyamide comprises from about 45 to about 90 parts by weight of the at least one long-chain monomer and from about 10 to about 55 parts by weight of the precursor monomers.

5. A molded article which is transparent, comprising:

a copolyamide composition as claimed in claim 1 which is molded.

6. The molded article according to claim 5, wherein up to about 15 mole percent of the at least two aromatic dicarboxylic acids are replaced by a long-chain aliphatic dicarboxylic acid having 9 to 36 carbon atoms.

7. The molded article according to claim 5, wherein the at least one copolyamide comprises from about 40 to about 95 parts by weight of the at least one long-chain monomer and from about 5 to about 60 parts by weight of the precursor monomers.

8. The molded article according to claim 5, wherein the at least one copolyamide comprises from about 45 to about 90 parts by weight of the at least one long-chain monomer and from about 10 to about 55 parts by weight of the precursor monomers.

9. The molded article according to claim 5, wherein the molded article is an article selected from the group consisting of a hollow body, a plate, a bar, a tube, and a fiber.

10. The copolyamide composition according to claim 1, wherein (A)+(B)+(C)=100 mol %.

11. The copolyamide composition according to claim 10, wherein the at least one long-chain monomer is lauric lactam.

12. The copolyamide composition according to claim 11, wherein the at least one long-chain monomer is lauric lactam, wherein the at least one diamine monomer is 3,3'-dimethyl-4,4'-diamine-dicyclohexylmethane, and wherein the at least two aromatic dicarboxylic acid monomers include terephthalic acid.

13. The copolyamide composition according to claim 10, wherein the at least one copolyamide consists essentially of the ingredients recited.

* * * * *